(12) United States Patent
Robinson

(10) Patent No.: US 6,997,655 B2
(45) Date of Patent: Feb. 14, 2006

(54) DEBURRING TOOL

(76) Inventor: James R. Robinson, 660 E. Allen, Howell, MI (US) 48855

( * ) Notice: Subject to any disclaimer, the term of this patent is extended or adjusted under 35 U.S.C. 154(b) by 254 days.

(21) Appl. No.: 10/717,353

(22) Filed: Nov. 19, 2003

(65) Prior Publication Data

US 2004/0101377 A1    May 27, 2004

Related U.S. Application Data

(60) Provisional application No. 60/427,638, filed on Nov. 19, 2002.

(51) Int. Cl.
B23B 51/00   (2006.01)

(52) U.S. Cl. .................. 408/156; 408/180; 408/181; 408/714

(58) Field of Classification Search ............. 408/153, 408/154, 155, 156, 159, 180, 181, 185, 187, 408/714; 82/1.2, 1.5
See application file for complete search history.

(56) References Cited

U.S. PATENT DOCUMENTS

| | | | |
|---|---|---|---|
| 1,008,363 A * | 11/1911 | Pica | 408/154 |
| 2,495,583 A * | 1/1950 | Heron | 82/1.5 |
| 2,571,395 A | 10/1951 | Vawter | 77/73.5 |
| 2,620,689 A * | 12/1952 | Cogsdill | 82/1.5 |
| 2,657,597 A | 11/1953 | Pickering et al. | 77/73.5 |
| 2,663,203 A * | 12/1953 | Fried et al. | 408/154 |
| 2,716,360 A * | 8/1955 | Cogsdill et al. | 82/1.2 |
| 2,739,497 A * | 3/1956 | Fried et al. | 408/156 |
| 2,745,299 A * | 5/1956 | Fried et al. | 82/1.2 |
| 2,855,812 A * | 10/1958 | Fried | 408/159 |
| 2,895,356 A | 7/1959 | Cogsdill | 77/73.5 |
| 2,940,367 A * | 6/1960 | Cogsdill | 408/79 |
| 3,017,791 A | 1/1962 | Fried | 77/73.5 |
| 3,166,958 A | 1/1965 | Cogsdill | 77/73.5 |
| 3,172,309 A | 3/1965 | Cogsdill | 77/73.5 |
| 3,306,136 A | 2/1967 | Gustkey | 77/58 |
| 4,086,018 A | 4/1978 | Robinson et al. | 408/226 |
| 4,147,463 A | 4/1979 | Robinson | 408/156 |
| 4,320,998 A | 3/1982 | Kubicek | 408/226 |
| 4,333,727 A | 6/1982 | Bennett | 408/191 |
| 5,277,528 A | 1/1994 | Robinson | 408/201 |
| 5,358,363 A | 10/1994 | Robinson | 408/153 |
| 5,501,554 A | 3/1996 | Robinson et al. | 408/153 |
| 5,755,538 A | 5/1998 | Heule | 408/154 |
| 5,803,679 A | 9/1998 | Heule | 408/211 |
| 6,533,505 B1 | 3/2003 | Robinson | 408/1 R |

* cited by examiner

Primary Examiner—Daniel W. Howell
(74) Attorney, Agent, or Firm—Bliss McGlynn, P.C.

(57) ABSTRACT

A deburring tool is adapted to be rotatably mounted in a chuck of a drive motor to perform deburring operations. The deburring tool includes an arbor and a blade having a cutting head portion defined at one end thereof and a clip portion defined substantially at the other end of the blade opposite the head portion. The blade is mounted relative to the arbor such that the blade projects a predetermined distance from the arbor in an unstressed condition. The blade is sufficiently resiliently yieldable such that it can move inwardly with respect to the arbor during deburring operations. The clip portion is adapted to flex to provide a spring-like force acting along the blade toward the head portion to facilitate insertion and removal of the blade relative to the deburring tool without use of any tools.

22 Claims, 7 Drawing Sheets

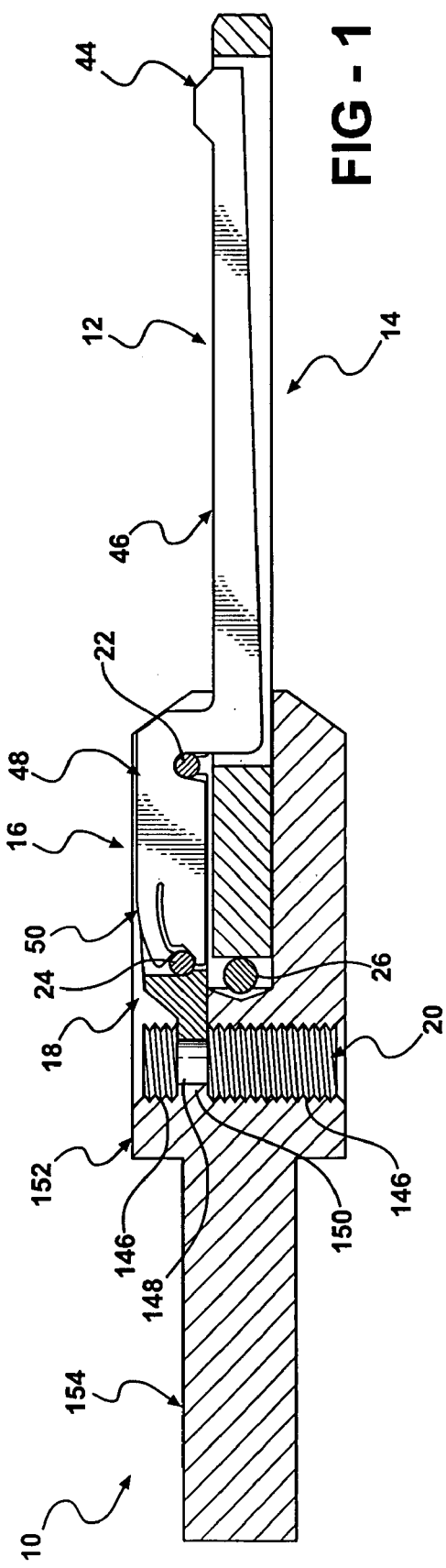
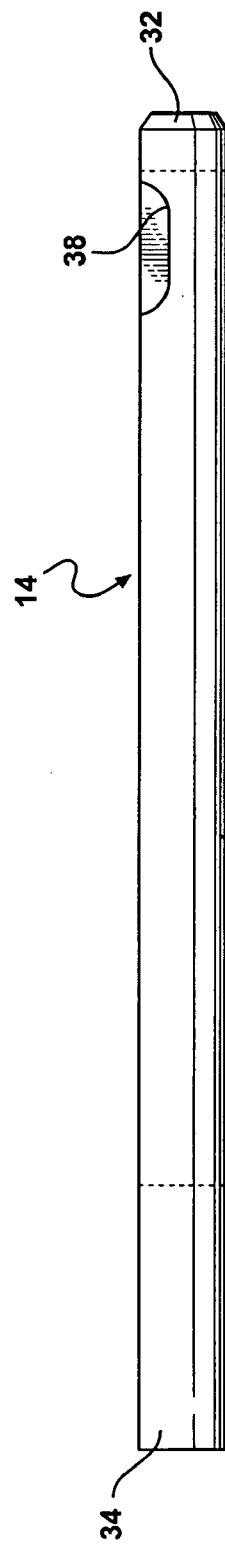
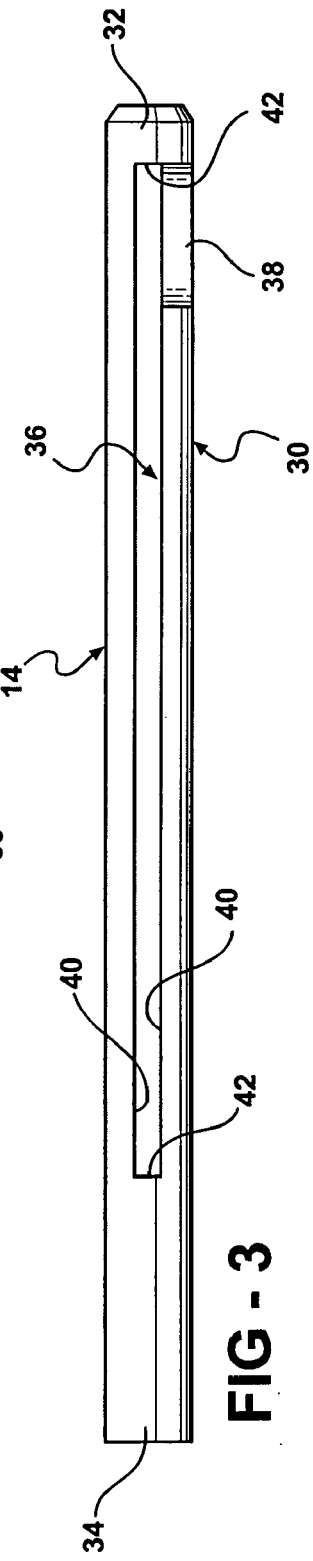
FIG - 1
FIG - 2
FIG - 3

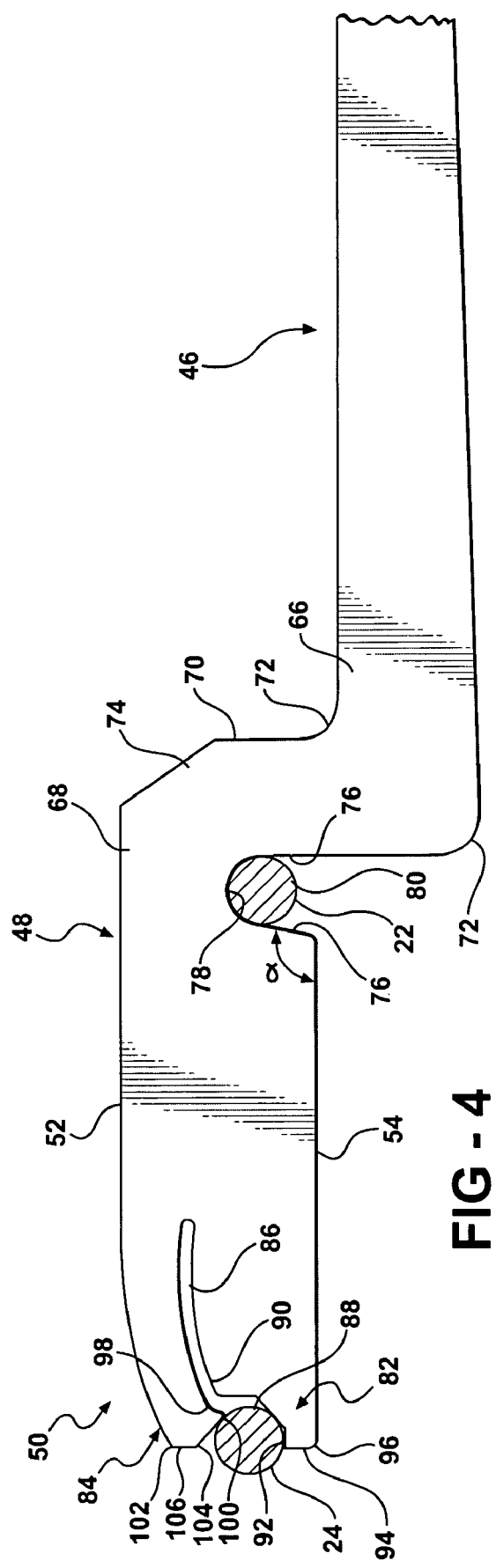
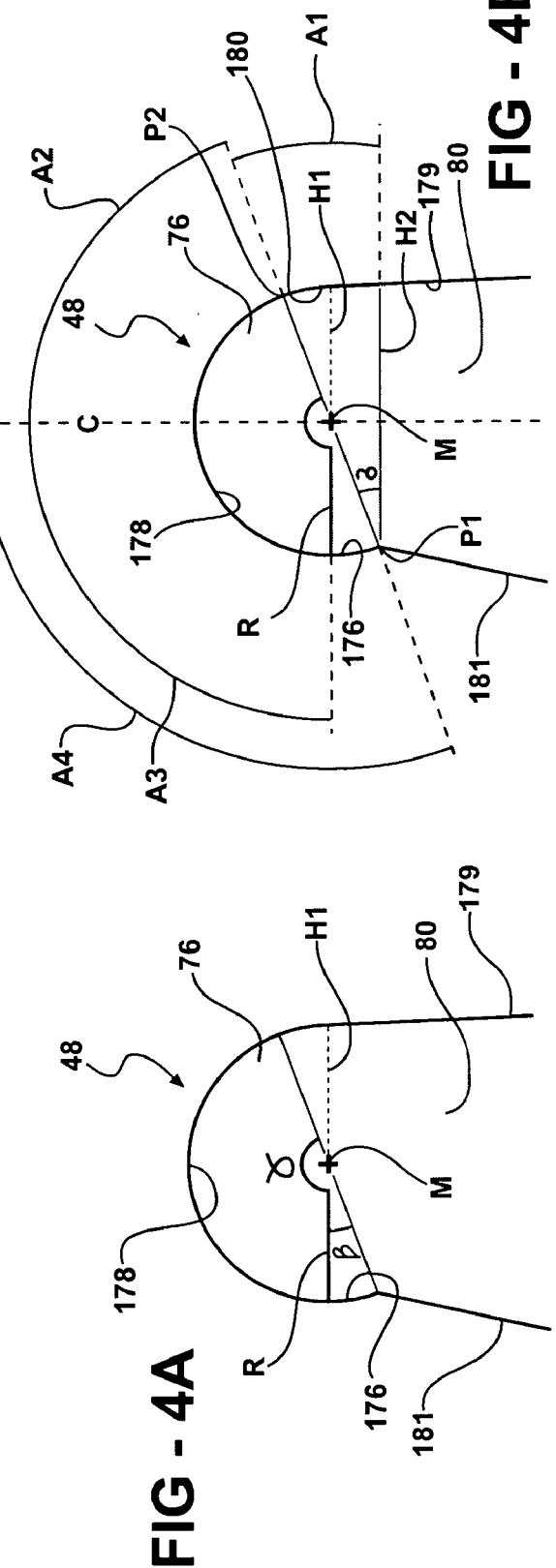
FIG - 4
FIG - 4A
FIG - 4B

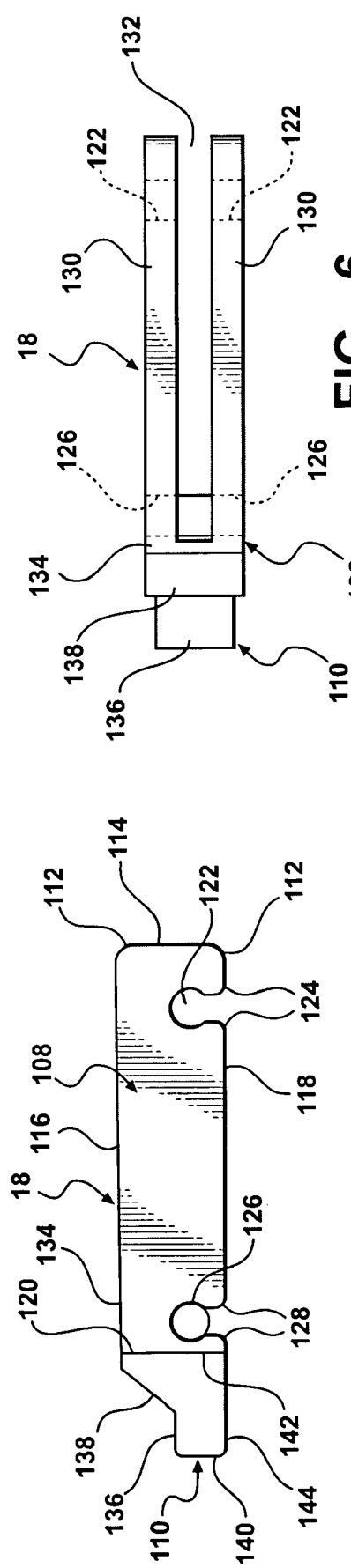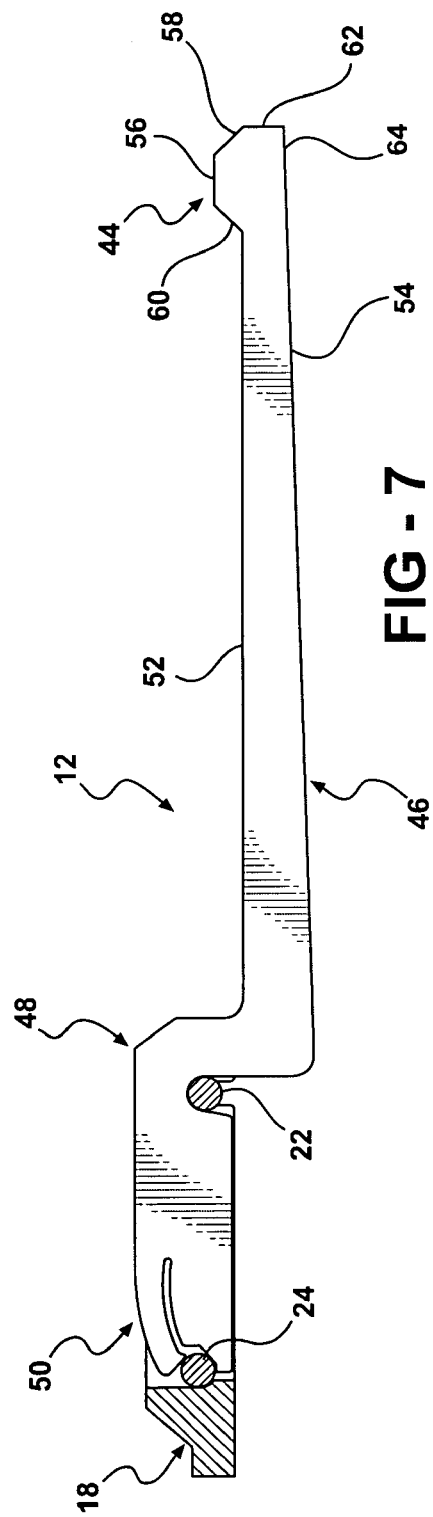

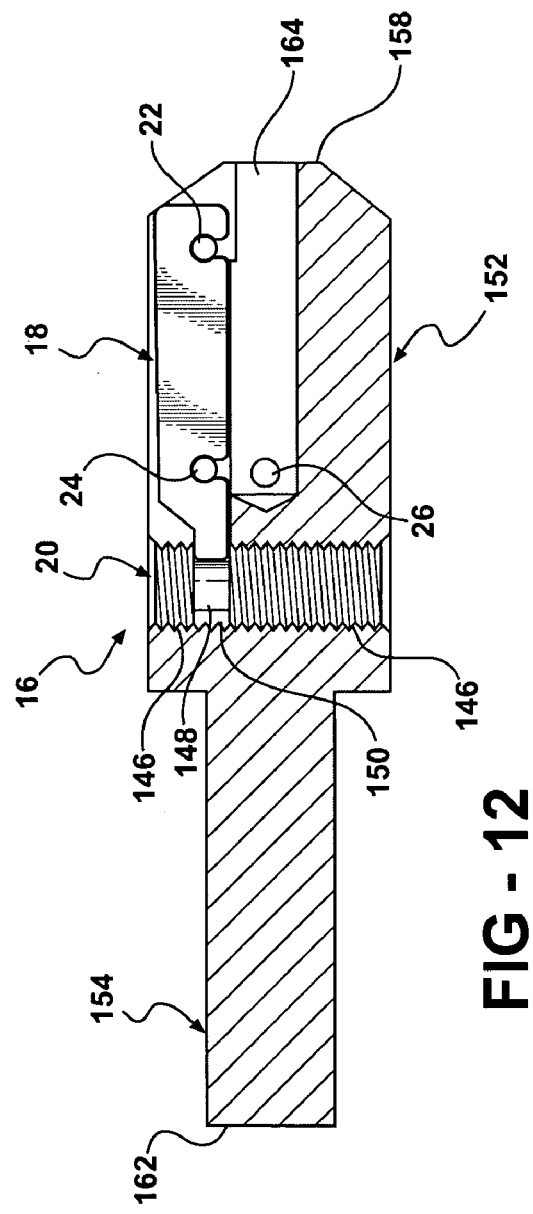
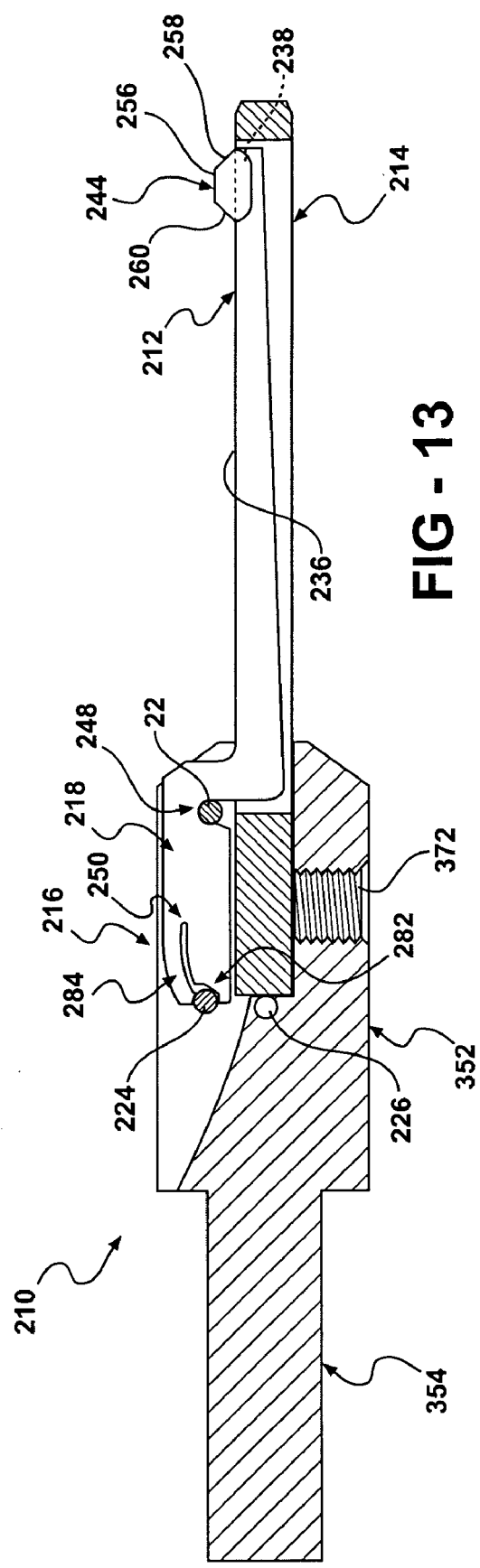
FIG - 12
FIG - 13

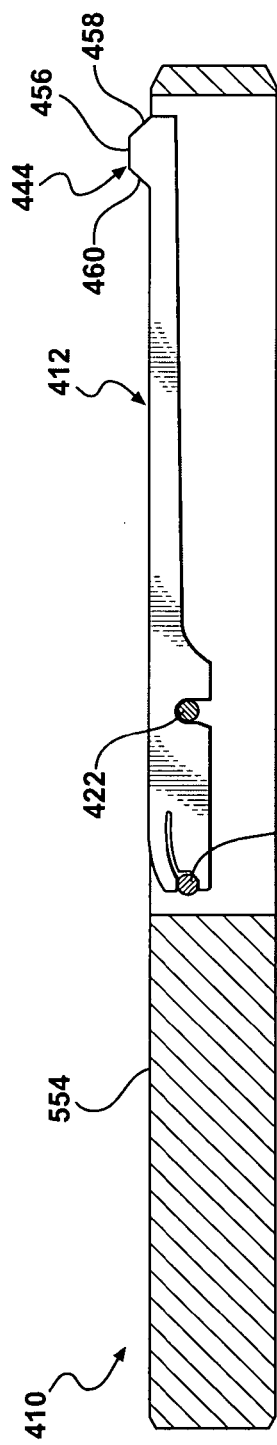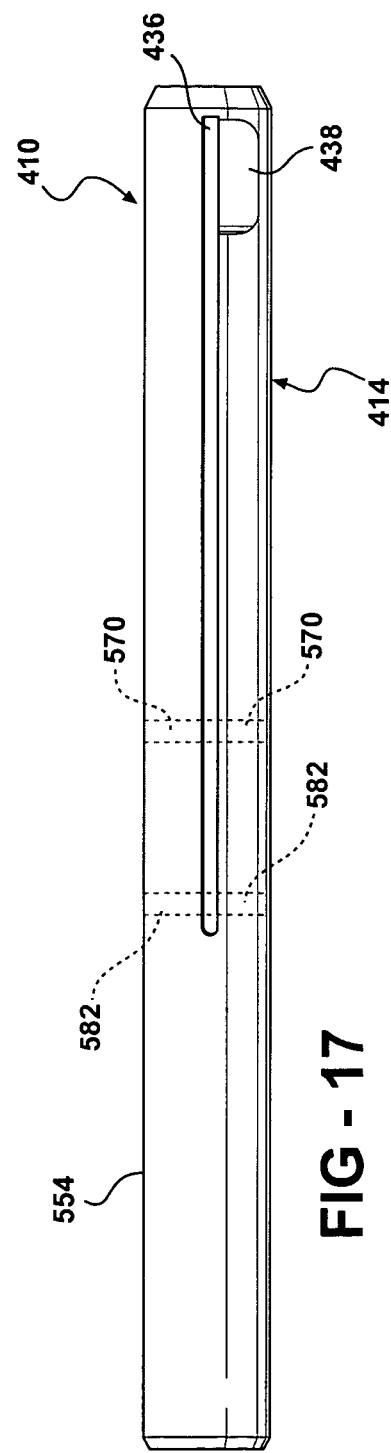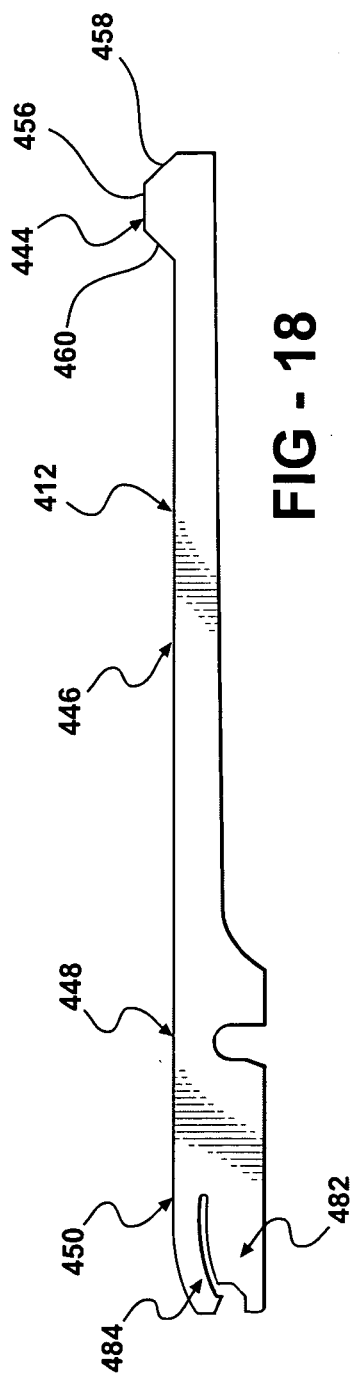

DEBURRING TOOL

CROSS-REFERENCE TO A RELATED APPLICATION

This application claims the benefit of U.S. Provisional Application No. 60/427,638 filed Nov. 19, 2002 and entitled "Deburring Tool."

BACKGROUND OF THE INVENTION

1. Field of the Invention

The present invention relates, in general, to deburring tools and, in particular, to deburring tools having a replaceable cutting tool.

2. Description of the Related Art

Deburring tools are generally employed to remove burrs left on edges defined by passages cut or drilled through work-pieces, such as valve bodies and the like, made of metal or other material and to cut a chamfer on the edges. Examples of deburring tools known in the related art are disclosed in U.S. Pat. No. 4,086,018 issued to Robinson et al. on Apr. 25, 1978 for a pin-type deburring tool having a replaceable cutting head; U.S. Pat. No. 4,147,463 issued to Robinson on Apr. 3, 1979 for an adjustable deburring tool having a replaceable and adjustable cutting head; U.S. Pat. No. 5,358,363 issued to Robinson on Oct. 25, 1994 for a lockable deburring tool having a replaceable and adjustable cutting head; and U.S. Pat. No. 5,501,554 issued to Robinson et al. on Mar. 26, 1996 for a second lockable deburring tool having a replaceable and adjustable cutting head.

Deburring tools of this type generally include an elongated cylindrical body, or arbor, formed with a recess for receiving a cutting tool. The recess extends a fixed distance into the arbor and typically has two closed ends. The recess defines a pair of opposed, flat surfaces disposed in spaced, parallel relationship with respect to one another. A unitary cutting tool is received in the recess of the arbor and includes a cutting head with an integral, elongated, flat, resilient blade extending therefrom. The cutting tool is removably mounted in the arbor such that a point is defined about which the blade can rotate.

More specifically, it is well known in the related art to mount the cutting tool in the arbor by a pair of axially spaced pins that extend transversely through the recess and a pair of spaced openings in the blade. One of the pins may be a roll pin that extends through one of the openings to define the pivot point. The other pin engages the other opening at the end of the blade opposite the cutting head and holds this end in non-pivotal relationship with respect to the arbor with the cutting head projecting from the recess for engaging a work-piece. The portion of the blade extending from the roll pin toward the cutting head is resiliently yieldable to permit the cutting head to move inwardly with respect to the recess during a deburring operation. The arbor and cutting tool may be removed and replaced by removing the pins. Deburring tools of this type are known in the related art as pin-type deburring tools having a fixed cutting head.

It is also well known in the related art to mount the cutting tool in the arbor by securing the end of the blade opposite the cutting head to the arbor in such a manner that not only is a portion of the blade yieldable to permit the cutting head to move inwardly with respect to the recess, as with a fixed cutting head, but the cutting head is also biased to an operable position extending from the recess. More particularly, the blade can be selectively pivotally adjusted with respect to the arbor to, in turn, adjust the unstressed position of the cutting head with respect to the recess. In this case, a pin is mounted in the arbor and extends transversely through the recess and the blade, and an adjustable screw is threadedly mounted in the arbor at a location spaced from the transverse pin with the longitudinal axis of the screw extending transversely to the arbor and perpendicularly to the longitudinal axis of the pin. The blade is connected with the screw in such a manner that rotation of the screw in the arbor pivotally adjusts the blade to adjust the unstressed position of the cutting head with respect to the recess. In other words, adjustment of the screw adjusts the pivot of the blade about the transverse pin, thereby adjusting the position of the cutting blade relative to the recess in the arbor prior to any deburring activity. The arbor and cutting tool may be removed and replaced by removing the pin and screw. Deburring tools of this type are known in the related art as adjustable deburring tools having an adjustable cutting head.

It is also well known in the related art to mount the cutting tool in the arbor and then to receive and mount the arbor in an assembly holder. In this case, the arbor includes a head portion disposed at one end of the arbor, and the recess extends from the head portion to the end of the arbor opposite the head portion. Furthermore, the cutting tool is mounted between the pair of opposed, flat surfaces defined by the recess and the arbor. The assembly holder has a central passage extending longitudinally through the assembly holder and adapted to receive the arbor. The central passage holds in position the pair of opposed, flat surfaces to frictionally clamp the cutting tool between the pair of opposed, flat surfaces. The assembly holder also has an aperture extending transversely to the central passage and adapted to receive a screw to fixedly mount the arbor and cutting tool within the assembly holder. In this way, the cutting tool can be mounted in the recess and held in place by the assembly holder. The assembly holder and, thus, the arbor and cutting tool may be removed and replaced by removing the screw. This type of deburring tool is not adjustable and may be used to deburr passages having relatively small diameters and in these cases has been referred to as a micro deburring tool.

It is well known in the related art also to mount the cutting tool in the arbor by another method using an adjustable screw and a pivot member. In this method, the screw is threadably mounted transversely in the arbor for fixedly engaging a terminal portion of the cutting tool. The pivot member extends transversely through the recess and the blade to define the pivot point about which the cutting tool can pivot and has a non-threaded, hemispherical portion with at least one flat face. The blade includes an open-arced, partially circumferential slot that, with the blade, defines a flat at one end of the partial circumference. The hemispherical portion is received in the slot and adapted to rotate therewithin until the flat face of the hemispherical portion comes into abutting engagement with the flat presented by the blade and slot to lock the blade within the arbor while permitting the blade to pivot about the pivot member. When it is time to change the cutting tool, the flat face is rotated out of engagement with the flat by rotation of the pivot member, the screw and pivot member are removed, and the blade is lifted from the arbor. The pivot member may be rotated by using an Allen wrench, a regular screwdriver, Phillips-head screwdriver, or any other type of conventional tool while the arbor remains mounted in a machine used to drive the deburring tool. This type of deburring tool is known in the related art as a lockable deburring tool and one also with an adjustable cutting head.

The cutting tools, in general, may be stamped from steel stock, with each being drilled with the openings or slot to accept the pins or pivot member, respectively, and then heat-treated to increase their hardness. The recess may be formed using a milling or grinding tool or a wire EDM as well. There are usually two to six blade changes before the arbor needs to be replaced.

While the deburring tools of the related art generally perform satisfactorily, they are not without their problems. For example, to replace worn-out cutting tools of some of the deburring tools of the related art, operators must remove them from the tool holders or rotating chucks of drive motors, drive the pins completely through the openings in the blades and out of the arbors, remove the blades from the arbors, replace the blades with new blades, and then drive the pins back into the arbors and through the openings in the new blades. This process is time-consuming and, therefore, expensive. In addition to this problem, each of the roll pins has a limited useful life of approximately one to three blade changes. Even with the deburring tools of the related art having cutting tools that can be replaced without the need to drive pins in and out of the arbors to remove the deburring tools from the machines, operators must still rotate the screws and pivot members with tools such that the worn-out cutting tools can slide out of the arbors and new cutting tools can slide into the arbors.

Thus, there is a need in the related art for a more convenient, cost-effective deburring tool that is made using high-quality tool steel. More specifically, there is a need in the related art for a deburring tool that makes changing a worn-out cutting tool thereof easier, faster, and tool-free and, thereby, reduces down-time in any deburring operation to increase the efficiency thereof.

SUMMARY OF THE INVENTION

The present invention overcomes the problems in the related art in a deburring tool adapted to be rotatably mounted in a chuck of a drive motor to perform deburring operations. The deburring tool includes an arbor and a blade having a cutting head portion defined at one end thereof and a clip portion defined substantially at the other end of the blade opposite the head portion. The blade is mounted relative to the arbor such that the blade projects a predetermined distance from the arbor in an unstressed condition. The blade is sufficiently resiliently yieldable such that it can move inwardly with respect to the arbor during deburring operations. The clip portion is adapted to flex to provide a spring-like force acting along the blade toward the head portion to facilitate insertion and removal of the blade relative to the deburring tool without use of any tools.

An advantage of the deburring tool of the present invention is that each of the blade and arbor can be easily exchanged and, thus, provides faster and more convenient and cost-effective blade and arbor changes than the deburring tools of the related art.

Another advantage of the deburring tool of the present invention is that each of the blade and arbor has a simple, efficient design to allow for low-cost manufacturing of the blade and arbor from durable and very hard M-2 high-speed tool steel.

Another advantage of the deburring tool of the present invention is that it allows a holder of the arbor to be left in a machine while the blade or arbor is exchanged, thereby eliminating a need to reset positions/movements of the machine and reducing downtime in any deburring operation to increase the efficiency thereof.

Another advantage of the deburring tool of the present invention is that it can be an adjustable-position deburring tool or a fixed-position deburring tool.

Another advantage of the deburring tool of the present invention is that each of the arbor and blade is interchangeable between a holder of the arbor of an adjustable-position deburring tool and a holder of the arbor of a fixed-position deburring tool of the same size.

Another advantage of the deburring tool of the present invention is that it includes mounting parts that last much longer than the mounting parts of the deburring tools of the related art.

Another advantage of the deburring tool of the present invention is that it can include a permanent holder, other than the arbor, in which most of the mechanics of the deburring tool are contained.

Another advantage of the deburring tool of the present invention is that no holes are required to be bored in the arbor.

Other objects, features, and advantages of the deburring tool of the present invention will be readily appreciated as the same becomes better understood while reading the subsequent description taken in conjunction with the accompanying drawings.

BRIEF DESCRIPTION OF THE DRAWINGS

FIG. 1 is a sectional side view of an adjustable version of the deburring tool of the present invention.

FIG. 2 is a side view of the arbor of the deburring tool of the present invention shown in FIG. 1.

FIG. 3 is a top view of the arbor of the deburring tool of the present invention shown in FIG. 1.

FIG. 4 is a partial side view of the blade of the deburring tool of the present invention shown in FIG. 1 illustrating the clip portion, the retaining portion, the retention pin, and the reaction member of the deburring tool.

FIG. 4A is an enlarged front view of the slot defined by the retaining portion of the blade of the deburring tool of the present invention shown in FIG. 1 illustrating the bearing surfaces of the retaining portion.

FIG. 4B is an enlarged front view of the slot defined by the retaining portion of the blade of the deburring tool of the present invention shown in FIG. 1 illustrating the bearing and non-bearing surfaces of the retaining portion.

FIG. 5 is a side view of the pivot cradle of the deburring tool of the present invention shown in FIG. 1.

FIG. 6 is a top view of the pivot cradle of the deburring tool of the present invention shown in FIG. 1.

FIG. 7 is a sectional side view of the pivot cradle in structural relationship with the clip blade of the deburring tool of the present invention shown in FIG. 1.

FIG. 12 is a sectional side view of the holder of the deburring tool of the present invention shown in FIG. 1 illustrating the arbor hole of the holder and the pivot cradle, the retention pin, the reaction member, the adjusting-screw, and the stop pin of the deburring tool.

FIG. 13 is a sectional side view of one embodiment of a fixed version of the deburring tool of the present invention.

FIG. 16 is a sectional side view of another embodiment of the fixed version of the deburring tool of the present invention.

FIG. 17 is a top view of the deburring tool of the present invention shown in FIG. 16.

FIG. 18 is a side view of the blade of the deburring tool of the present invention shown in FIG. 16.

DETAILED DESCRIPTION OF PREFERRED EMBODIMENTS OF THE INVENTION

Figure 8:
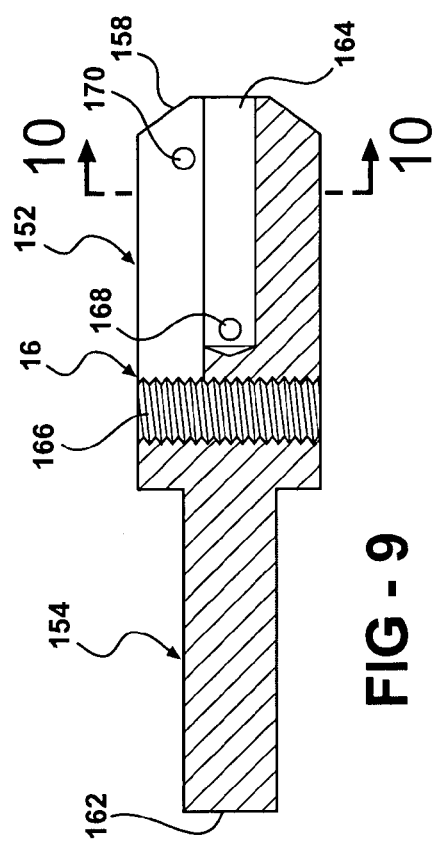
FIG. 8 is a side view of the pivot cradle in structural relationship with the adjusting screw of the deburring tool of the present invention shown in FIG. 1 illustrating the pivot point of the pivot cradle.

Referring now to the figures, where like numerals are used to designate like structure, a deburring tool of the present invention is generally indicated at 10 in FIG. 1, 210 in FIG. 13, and 410 in FIG. 16. The deburring tool 10 shown in FIG. 1 is an adjustable-position deburring tool 10, and the deburring tools 210, 410 shown in FIGS. 13 and 16, respectively, are fixed-position deburring tools 210, 410. The difference between the adjustable-position deburring tool 10 and the fixed-position deburring tools 210, 410 is explained below.

Referring now to FIGS. 1–12, the deburring tool 10 is adapted to be rotatably mounted in a chuck (not shown) of a drive motor (not shown) to perform deburring operations. The deburring tool 10 generally includes an arbor, generally indicated at 14, and a blade, generally indicated at 12. The blade 12 has a cutting head portion, generally indicated at 44, defined at one end thereof and a clip portion, generally indicated at 50, defined substantially at the other end of the blade 12 opposite the head portion 44. The blade 12 is mounted relative to the arbor 14 such that the blade 12 projects a predetermined distance from the arbor 14 in an unstressed condition. The blade 12 is sufficiently resiliently yieldable such that it can move inwardly with respect to the arbor 14, during deburring operations. The clip portion 50 is adapted to flex to provide a spring-like force acting along the blade 12 toward the head portion 44 to facilitate insertion and removal of the blade 12 relative to the deburring tool 10 without use of any tools.

In a preferred embodiment of the deburring tool 10 and as shown in FIG. 1, the blade 12 is replaceable and unitary and defines a longitudinal axis. The arbor 14 (or pilot) is elongated, substantially cylindrical, and replaceable and adapted to support the blade 12. The deburring tool 10 also includes a holder, generally indicated at 16, adapted to receive and mount both the arbor 14 and the blade 12. The holder 16 is also adapted to support a pivot cradle, generally indicated at 18, an adjusting screw, generally indicated at 20, a retention pin 22, a reaction member 24, a stop pin 26, and a clamp screw (not shown) within the holder 16. Elements 12, 14, 16, 18, 20, 22, 24, and 26 are discussed in further detail below.

Referring now to FIGS. 2 and 3, the arbor 14 includes a body, generally indicated at 30, that defines a longitudinal axis and has a head portion 32 disposed at one end of the body 30 and a tail portion 34 disposed at the other end of the body 30. As shown in FIG. 3, the body 30 also has a channel, generally indicated at 36, extending diametrically into the body 30. As shown in FIGS. 2 and 3, the body 30 also has a pair of chip slots 38 disposed integrally with and on respective opposed sides of a portion of the channel 36 proximate the head portion 32 for collecting metal burrs cut by the blade 12 during operation of the deburring tool 10. Without the chip slot 38, the burrs would wedge into the channel 36 and bind with the blade 14.

Preferably and as shown in FIGS. 2 and 3, the tail portion 34 has a substantially flat end and is longer than the head portion 32, which has a substantially hemispherical end. Also preferably and as shown in FIG. 3, the body 30 and the channel 36 define a pair of flat sides 40 disposed in spaced, parallel relationship with respect to one another and each of which extends from the head portion 32 to the tail portion 34. In addition, the body 30 and the channel 36 define a pair of flat ends 42 disposed in spaced, parallel relationship with respect to one another and each of which extends from one side 40 to the other side 40. As shown in FIG. 1, the blade 12 is adapted to be removably supported between the sides 40.

Those having ordinary skill in the art will appreciate that the arbor 12, in general, and the channel 36, in particular, can have any suitable shape and dimensions to support the blade 12. Those having ordinary skill in the art will also appreciate that the channel 36 can be formed by any suitable method and device, such as by a wire electrical-discharge machine (EDM) or milling or grinding tools.

Referring now to FIGS. 4 and 7, the blade 12 includes a head portion, generally indicated at 44 in FIG. 7; a resilient flex portion, generally indicated at 46, extending from the head portion 44; a retaining portion, generally indicated at 48, extending from the flex portion 46; and the clip portion 50 extending from the retaining portion 48. The blade 12 also includes a top surface 52 and a bottom surface 54 disposed spaced from and generally parallel to the top surface 52. The blade 12 must be sufficiently strong, durable, and wear-resistant. Each of the head portion 44, flex portion 46, retaining portion 48, and clip portion 50 will now be described in further detail.

Referring now to FIG. 7, the head portion 44 is of a substantially trapezoidal side cross-section and has a non-cutting top surface 56, a leading cutting surface 58 extending from the edge of the top surface 56 opposite the retaining portion 48 at an obtuse angle with respect to the top surface 56. The head portion 44 also includes a trailing cutting surface 60 extending from the opposite edge of the top surface 56 at an obtuse angle with respect to the top surface 56. The head portion 44 also has a front surface 62 disposed substantially perpendicularly to the top surface 56 and a bottom surface 64 disposed substantially parallel with the top surface 56. Preferably, the leading surface 58 and the trailing surface 60 extend from the respective edges of the top surface 56 at a substantially identical obtuse angle with respect to the top surface 56, such as 135°. However, it will be understood by those having ordinary skill in the art also that the leading surface 58 and the trailing surface 60 can extend from the respective edges of the top surface 56 at any suitable angle with respect to the top surface 56.

The head portion 44 can have any suitable size and shape. Furthermore, the resistance to wear of the head portion 44 can be critical. Accordingly, the head portion 44 is made preferably of a hard, or an upgraded-quality, steel, such as high-speed M-2 tool steel.

As best shown in FIG. 7, the flex portion 46 is elongated and extends integrally from the head portion 44 and the retaining portion 48. The flex portion 46 also tapers from the retaining portion 48 to the head portion 44. More specifically, the top surface 52 of the flex portion 46 is substantially parallel with the top surface 56 of the head portion 44, but the bottom surface 54 of the flex portion 46 tapers from the retaining portion 48 to the bottom surface 64 of the head portion 44. The flex portion 46 is also substantially flexible and flat and defines a longitudinal axis of the blade 12. As shown in FIG. 1, the head portion 44 and the flex portion 46 are adapted to be disposed between the sides 40 and the ends 42 defined by the channel 36 and the body 30 of the arbor 14. Of course, the flex portion 46 can have any suitable size and shape.

As best shown in FIG. 4, the retaining portion 48 extends integrally from the flex portion 46 and the clip portion 50 to form a stairway from the flex portion 46 to the clip portion 50. In this way, the retaining portion 48 defines a bottom step 66, a top step 68, and a riser 70 disposed between the bottom and top steps 66, 68, respectively. The top step 68 is disposed substantially parallel with the bottom step 66, and the riser 70 is disposed substantially perpendicularly to the bottom and top steps 66, 68, respectively. In a preferred embodiment of the deburring tool 10, the longitudinal axis of the clip portion 50 is disposed in longitudinally spaced relation with respect to the longitudinal axis of the flex portion 46.

The retaining portion 48 includes a slot 76 adapted to receive the retention pin 22. The retention pin 22 and the slot 76 cooperate to retain the blade 12 relative to the retention pin 22 in a stressed condition of the blade 12 when the blade 12 moves inwardly with respect to the arbor 14 during deburring operations. More specifically, the blade 12 is fixedly mounted within the pivot cradle 18, which is pivotally mounted within the holder 16 and described in greater detail below.

More specifically, the curved edges 72 formed between the bottom step 66 and the riser 70 are substantially arcuate. The edge 74 formed between the riser 70 and the top step 68 is substantially diagonal. The keyhole-type slot 76 is defined between the riser 70 and the top step 68 and extends at least partially into a side surface of the retaining portion 48. The slot 76 is adapted to receive the retention pin 22.

More specifically, the bottom surface 54 and the slot 76 define an open-arced, partially circumferential surface 78 and an opening 80. The bottom surface 54 of the retaining portion 48 proximate the clip portion 50 and adjacent the opening 80 defines an obtuse angle "α" with respect to the surface 78. The bottom surface 54 of the retaining portion 48 proximate the flex portion 46 and adjacent the opening 80 is integral with the riser 70. As will be described in greater detail below, the retaining portion 48 is adapted to be removably mounted onto the retention pin 22, and the slot 76 and the opening 80 act to facilitate this mounting action. As shown in FIG. 1, the retaining portion 48 is adapted to be received and mounted within the holder 16 in the assembled state of the deburring tool 10.

Also as best shown in FIG. 4, the clip portion 50 extends integrally from the retaining portion 48. The clip portion 50 includes a lower jaw, generally indicated at 82, and an upper jaw, generally indicated at 84, disposed in spaced relation to the lower jaw 82. The lower and upper jaws 82, 84 are adapted to flex with respect to each other to provide the spring-like force that aids in retaining the blade 12 in the mounted condition with respect to the arbor 14 during deburring operations.

More specifically, the lower and upper jaws 82, 84, respectively, form the back of the blade 12 and face the left as viewed in FIG. 4. The upper jaw 84 is arcuately shaped. However, those having ordinary skill in the art will appreciate that the upper jaw 84 can have any suitable shape. The space defined between the lower and upper jaws 82, 84, respectively, extends partially and substantially longitudinally into the clip portion 50 and forms an arcuate slot 86 that is concave with respect to the lower jaw 82. The end of the slot 86 proximate the retaining portion 48 is rounded, the end of the slot 86 opposite the retaining portion 48 is open, and the sides of the slot 86 are substantially parallel with respect to one another. Preferably, the lower jaw 82 has a depth that is substantially greater than the depth of the upper jaw 84.

The clip portion 50 further includes the reaction member 24 that is operatively engaged by the lower and upper jaws 82, 84, respectively. The lower and upper jaws 82, 84, respectively, are adapted to flex against the reaction member 24 to provide the spring-like force toward the head portion 44. The reaction member 24 is adapted to support the blade 12 relative to the deburring tool 10 upon flexing of the lower and upper jaws 82, 84, respectively.

More specifically, the open end of the slot 86 defines a clearance 88 that substantially broadens outwardly from the slot 86 and is adapted to receive the reaction member 24. Preferably and as shown throughout the figures, the reaction member is a clip pin 24 that extends transversely to the longitudinal axis of the blade 12.

Even more specifically, beginning at point 90 of the top of the lower jaw 82 defining the open end of the slot 86, the lower jaw 82 extends substantially vertically toward the bottom surface 54 of the clip portion 50 for a predetermined distance, then substantially at an acute angle with respect to the clearance 88 for a predetermined distance, then substantially concave with respect to the clearance 88 for a predetermined distance, and then substantially horizontally to point 92 at the back of the blade 12. From the point 92, the lower jaw 82 extends, forming a back surface 94 of the lower jaw 82, substantially vertically toward the bottom surface 54 of the clip portion 50. The edge 96 joining the back surface 94 and the bottom surface 54 of the clip portion 50 is substantially arcuate. The clearance 88 is disposed more closely to the bottom surface 54 of the clip portion 50 than is the slot 86, and a substantial portion of the clearance 88 is disposed more closely to the back of the blade 12 than is the slot 86.

Beginning at point 98 of the bottom of the upper jaw 84 defining the open end of the slot 86, the upper jaw 84 extends substantially vertically toward the bottom surface 54 of the clip portion 50 for a predetermined distance to arc 100, then substantially concave with respect to the edge 102 joining the top surface 52 of the clip portion 50 and the back of the blade 12 for a predetermined distance, and then substantially diagonally to point 104 at the back of the blade 12. From the point 104, the upper jaw 84 extends, forming a back surface 106 of the upper jaw 84, substantially vertically to the edge 102. The edge 102 is substantially arcuate. The back surfaces 94, 106 are spaced from and substantially parallel and aligned with respect to one another. As shown in FIG. 1, like the retaining portion 48, the clip portion 50 is supported within the holder 16 in the assembled state of the deburring tool 10.

Returning to FIG. 4, as the upper jaw 84 is activated by a hand of an operator of the deburring tool 10, for instance, the blade 12 is forced forwardly, or in a direction toward the head portion 44, resulting in the retention pin 22 retaining the retaining portion 48. Conversely, when the blade 12 is forced rearwardly, or in a direction toward the clip portion 50, the retaining portion 48 is released from the retention pin 22, thus allowing for removal of the blade 12 from the arbor 14.

It will be understood by those having ordinary skill in the art that the retaining portion 48 and the clip portion 50 can have any suitable size and shape and any suitable structural relationship with respect to one another to allow the flex portion 46 of the blade 12 to flex during the deburring process. In other words, the retaining portion 48 and the clip portion 50 must be designed such that the retention pin 22 can retain the retaining portion 48 and the retaining portion 48 can be released from the retention pin 22, thus allowing for removal of the blade 12 from the arbor 14.

Referring now back to FIG. 1, the pivot cradle 18 is adapted to pivotally support the blade 12 and to adjust the predetermined distance that the cutting head 44 projects from the arbor 14 in an unstressed condition. More specifically, the pivot cradle 18 is also adapted to receive the retention pin 22 and the clip pin 24, for instance, and be received within the adjusting screw 20. Even more specifically, the pivot cradle 18 is adapted to support the retaining portion 48 and the clip portion 50 of the blade 12 within the holder 16. The pivot cradle 18 will now be described in further detail with reference to FIGS. 5, 6, and 8.

As shown in FIGS. 5, 6, and 8, the pivot cradle 18 includes a body portion, generally indicated at 108, having a slot 132 adapted to support the blade 12. The body portion 108 is adapted to pivot about the retention pin 22 so as to adjust the predetermined distance that the cutting head 44 projects from the arbor 14 in the unstressed condition.

More specifically, the pivot cradle 18 also includes a tail portion, generally indicated at 110, that integrally extends from an end surface of the body portion 108. The body portion 108 is substantially rectangular in side cross-section. As shown in FIG. 6, the top cross-section of the pivot cradle 18 resembles a substantially clothes-pin shape. The body portion 108 is adapted to receive the retention pin 22 and the clip pin 24, and the tail portion 110 is adapted to be received by the adjusting screw 20.

As shown in FIGS. 5 and 8, edges 112 joining end surface 114 of the body portion 108 opposite the tail portion 110 to top and bottom surfaces 116, 118, respectively, of the body portion 108 are substantially arcuate. As shown only in FIG. 5, end surface 120 of the body portion 108 proximate the tail portion 110 forms a substantial right angle with respect to each of the top and bottom surfaces 116, 118, respectively. The top surface 116 tapers slightly toward the tail portion 110 such that the top and bottom surfaces 116, 118, respectively, are not parallel with respect to one another. The end surfaces 114, 120 are substantially parallel with respect to one another.

The body portion 108 defines an open-ended slot 122 that is disposed proximate the bottom surface 118 and the end surface 114 and opens to/from the bottom surface 118. Each of edges 124 defined by the slot 122 and the bottom surface 118 is substantially concave with respect to the interior of the body portion 108. As best shown in FIG. 6, the slot 122 extends completely from one side of the body portion 108 to the other side of the body portion 108. The slot 122 is adapted to receive the retention pin 22, which holds the pivot cradle 18 in position as well as provides a pivot point "+," as shown in FIG. 8, about which the blade 12 can pivot into and out of the channel 36 of the arbor 12, which is shown in FIG. 3, using the adjusting screw 20, to be described in detail below.

Returning to FIGS. 5 and 8, the body portion 108 also defines another slot 126 that is disposed proximate the bottom surface 118 and the end surface 120 and opens to/from the bottom surface 118. Each of edges 128 defined by the slot 126 and the bottom surface 118 is a vertex of a substantial right angle. As best shown in FIG. 6, the slot 126 extends completely from one side of the body portion 108 to the other side of the body portion 108. The slot 126 is adapted to receive the clip pin 24 such that the clip pin 24 extends preferably just beyond each end of the slot 126. The clip pin 24 does not extend to respective sides of the holder 16.

As shown in a top cross-section of the pivot cradle 18 in FIG. 6, the body portion 108 preferably includes a pair of prongs 130 having substantially identical dimensions and extending substantially to the end surface 114. The slot 132 defined between the prongs 130 has substantially the same dimensions as the prongs 130 have. The slots 122, 126 and, thus, the retention pin 22 and the clip pin 24, respectively, are adapted to penetrate completely through both prongs 130 and the slot 132.

Still preferably and as shown in FIGS. 5, 6, and 8, the slot 122 is disposed farther from the end surface 114 than the slot 126 is disposed from the end surface 120. The slots 122, 126 are substantially round and of substantially the same size and disposed a substantially equal distance from the bottom surface 118 such that the slots 122, 126 are substantially aligned. However, those having ordinary skill in the art will appreciate that the slots 122, 126 can have any suitable size, shape, and placement on the body portion 108, in particular, and the body portion 108 can have any suitable size and shape, in general, to receive the retention and clip pins, 22, 24, respectively.

As shown in FIGS. 5 and 8, the tail portion 110 extends integrally and co-extensively from the body portion 108 and, from a side cross-section of the pivot cradle 18, resembles a stairway having a top step 134, a bottom step 136, and a riser 138 between the top and bottom steps 134, 136, respectively. The top step 134 is disposed adjacent the body portion 108, the riser 138 extends diagonally away from the body portion 108, and the bottom step 136 is disposed about half of the depth of the tail portion 110 from the top step 134. As shown in FIG. 6, the bottom step 136 is also longitudinally centered with the riser 138 and the top step 134, but the sides of the bottom step 136 are substantially equidistantly inset from the respective sides of the riser 138 and the top step 134.

As shown in FIG. 5, end surfaces 140, 142 of the tail portion 110 are substantially parallel with respect to one another and the end surfaces 114, 120 of the body portion 108. The top of the bottom step 136 and the bottom surface 144 of the tail portion 110 are substantially parallel with respect to one another and the bottom surface 118 of the body portion 108.

As shown in FIGS. 1, 8, and 12, the tail portion 110 is adapted to be received within the adjusting screw 20. In this regard and as shown in FIGS. 1 and 12, the adjusting screw 20 is substantially cylindrical and extends through and is threadedly mounted within the holder 16. The longitudinal axis of the adjusting screw 20 extends substantially normal to the longitudinal axis of the holder 16.

As shown in FIGS. 1, 8, and 12, the adjusting screw 20 is formed with two threaded portions 146 and a non-threaded portion 148 disposed between the threaded portions 146 and substantially off longitudinal center of the adjusting screw 20. The threaded portions 146 are of substantially uniform diameter, and the threaded portion 146 proximate the bottom surface 144 of the tail portion 110 is longer than the other threaded portion 146. The non-threaded portion 148 is of substantially uniform diameter, which is smaller than that of the threaded portions 146, and is shorter than each of the threaded portions 146. The threaded and non-threaded portions 146, 148, respectively, define an annular groove 150 that is adapted to receive the bottom step 136 of the tail portion 110. The bottom step 136 projects into engagement with the non-threaded portion 148 and is held there by the clamping force of the resulting threaded portions 146.

A recess can be formed in either end or both ends of the adjusting screw 20 for receiving a tool (not shown) to rotatably adjust the adjusting screw 20. Rotation of the adjusting screw 20 causes the pivot cradle 18 and, thus, the blade 12 to pivot about the retention pin 22 to adjust the unstressed position of the head portion 44 of the blade 12 with respect to the channel 36 of the arbor 14. This ability to so adjust defines the adjustable-position deburring tool 10.

More specifically, rotation of the adjusting screw 20 lowers or raises, depending upon the direction of rotation, the adjusting screw 20 within the holder 16. Since the bottom step 136 of the tail portion 110 of the pivot cradle 18 is received within the annular groove 150 defined by the adjusting screw 20, the tail portion 110 moves tandemly downward or upward with the adjusting screw 20. This movement of the tail portion 110 causes the body portion 108 of the pivot cradle 18 to pivot clockwise or counter-clockwise, depending upon the direction of movement, about the retention pin 22. Since the body portion 108 supports the blade 12, the blade 12 tandemly pivots with the body portion 108 to adjust the unstressed position of the head portion 44 of the blade 12 with respect to the channel 36 of the arbor 14.

Referring now to FIGS. 9 through 12, the holder 16 has a central opening, also known as the arbor hole 164, adapted to receive and mount the arbor 14. In addition, the holder 16 has a cradle pocket 174 that is adapted to receive and mount the pivot cradle 18. The adjusting screw 20 is operatively supported for adjustable movement in the holder 16 so as to engage the tail portion 110 of the pivot cradle 18 and, thereby, adjustably pivot the pivot cradle 18 about the retention pin 22.

Figure 11:
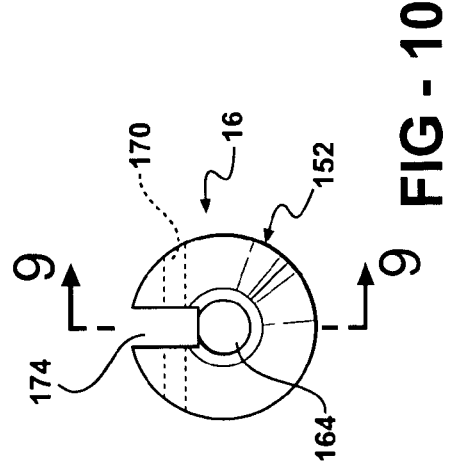
FIG. 11 is a top view of the holder of the deburring tool of the present invention shown in FIG. 1 illustrating the arbor hole, the adjusting-screw hole, the clamp-screw hole, the stop-pin hole, and the retention-pin hole of the holder.

More specifically, the holder 16 includes a substantially cylindrical mandrel, generally indicated at 152, having a first diameter. The holder 16 also includes a substantially cylindrical shank, generally indicated at 154, integrally and co-axially extending from an end surface 156 of the mandrel 152, as shown in FIG. 11. The shank 154 has a second diameter smaller than the first diameter of the mandrel 152. The end surface 158 of the mandrel 152 opposite the shank 154 is shaped like a partial right-circular cone. As shown in FIG. 11, the end surface 156 of the mandrel 152 is formed substantially at a right angle with respect to the circumference of the mandrel 152. The end surfaces 162 of the shank 154 are formed substantially at a right angle with respect to the circumference of the shank 154 and substantially parallel with the end surface 156 of the mandrel 152. The shank 154 is adapted to be received by the chuck of the drive motor.

Figure 9:
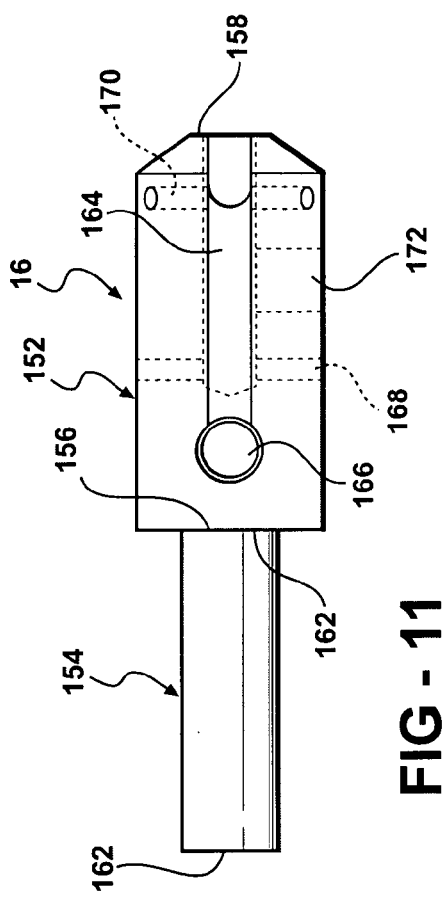
FIG. 9 is a sectional side view of the holder of the deburring tool of the present invention shown in FIG. 1 taken substantially along line "9—9" of FIG. 10 showing the arbor hole, the adjusting-screw hole, the stop-pin hole, and the retention-pin hole of the holder.
Figure 10:
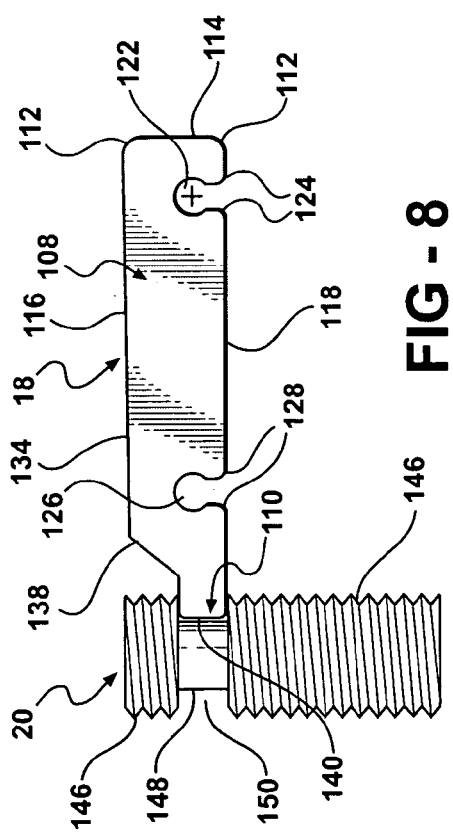
FIG. 10 is a sectional front view of the holder of the deburring tool of the present invention shown in FIG. 1 taken substantially along line "10—10" of FIG. 9 showing the cradle pocket, the arbor hole, and the retention-pin hole of the holder.

As shown in FIG. 12, the mandrel 152 is adapted to receive and mount both the arbor 14 and the blade 12 independently of one another and also serves to support the pivot cradle 18 within the mandrel 152. As shown in FIGS. 9 and 11, the mandrel 152 also includes an arbor hole 164, an adjusting-screw hole 166, a stop-pin hole 168, and a retention-pin hole 170. Each of the holes 164, 166, 168, 170 has a substantially circular transverse cross-section. In addition, the mandrel 152 also has a clamp-screw hole 172, as shown in FIG. 11, and a cradle pocket 174, as shown in FIG. 10. Each of the holes 164, 166, 168, 170, 172 and the cradle pocket 174 will now be described in further detail with reference to FIGS. 9 through 12.

The arbor hole 164 extends through the substantial center longitudinal line of the mandrel 152 from the end of the mandrel 152 opposite the shank 154 to greater than midway into the mandrel 152. The arbor hole 164 is adapted to receive the arbor 14 such that the deburring tool 10 may be mounted in the drive motor.

The adjusting-screw hole 166 is disposed completely diametrically through the mandrel 152 and substantially perpendicularly to the arbor hole 164. The adjusting-screw hole 166 is adapted to receive the adjusting screw 20 to fixedly mount the pivot cradle 18 and, thus, the blade 12 in the mandrel 152 and the arbor 14 within the arbor hole 164. The adjusting-screw hole 166 is also disposed substantially equidistantly from the arbor hole 164 and the end surface 156 of the mandrel 152.

The stop-pin hole 168 is disposed completely diametrically through the mandrel 152, in general, and the end of the arbor hole 164 proximate the adjusting-screw hole 166, in particular. The stop-pin hole 168 is also disposed substantially perpendicularly to both the arbor hole 164 and the adjusting-screw hole 166. The stop-pin hole 168 is adapted to receive the stop pin 26 to stop the arbor 14 from extending any farther into the mandrel 152. The stop-pin hole 168 is disposed substantially equidistantly from the adjusting-screw hole 166 and the clamp-screw hole 172.

The clamp-screw hole 172 is disposed diametrically through the mandrel 152 to the arbor hole 164 and substantially perpendicularly to both the arbor hole 164 and the adjusting-screw hole 166 (or substantially parallel to the stop-pin hole 168). The clamp-screw hole 172 is adapted to receive the clamp screw, such as an Allen screw, to clamp the arbor 14 into position within the mandrel 152. The clamp-screw hole 172 is disposed also substantially equidistantly from the stop-pin hole 168 and the retention-pin hole 170. Since the arbor 14 is fastened in the holder 16 with an Allen screw, for instance, a tool, such as an Allen wrench, is required to replace the arbor 14.

The retention-pin hole 170 is disposed completely through the mandrel 152 as a chord, in general, and the cradle pocket 174, in particular, above the arbor hole 164. More specifically, the central portion of the retention-pin hole 170 is disposed more closely to the arbor hole 164 than to the circumference of the mandrel 152. The retention-pin hole 170 is disposed also substantially perpendicularly to both the arbor hole 164 and the adjusting-screw hole 166 (or substantially parallel to the stop-pin hole 168 and the clamp-screw hole 172). The retention-pin hole 170 is adapted to receive the retention pin 22 to hold the pivot cradle 18 in position as well as provide the pivot point "+" about which the blade 12 can pivot into and out of the channel 36 of the arbor 14 using the adjusting screw 20. The retention-pin hole 170 is also disposed substantially equidistantly from the clamp-screw hole 172 and the end of the mandrel 152 opposite the shank 154.

The cradle pocket 174 is open to the exterior of the mandrel 152 and disposed partially diametrically through the mandrel 152 to the arbor hole 164. The cradle pocket 174 is also disposed substantially perpendicularly to both the arbor hole 164 and the retention-pin hole 170 (or substantially parallel to the adjusting-screw hole 166). The cradle pocket 174 is adapted to accept the pivot cradle 18, is wider than the channel 36 of the arbor 14, and has a substantially rectangular transverse cross-section, as shown in FIG. 10.

As shown in FIGS. 4A and 4B, the slot 76 defines arc surfaces 176, 178 and midpoint "M." An imaginary line "H1" extends substantially horizontally through the substantial midpoint "M" of the slot 76. Arc surface 176 subtends a predetermined angle "β" below horizontal "H1," and arc surface 178 subtends a predetermined angle "γ" above horizontal "H1." Arc surface 178 is adapted to act as a bearing surface for the retention pin 22 to retain the blade 12 relative to the retention pin 22 in the stressed condition of the blade 12, or, during a deburring operation when the retaining portion 48 applies a force upon the retention pin 22 in a substantially downward direction. As explained above, the clip portion 50 is adapted to flex to provide a spring-like force acting in the substantially forward direction. In this way, arc surface 176 is adapted to act as a bearing surface for the retention pin 22 when the deburring tool 10 is not performing a deburring operation. Arc surfaces 176, 178 combine to act as a single arc surface.

More specifically, the slot 76 also defines a radius "R" substantially equal to the radius of the retention pin 22. As shown in FIG. 4A, arc surface 176 is defined on the inner perimeter of the slot 76 and subtends the angle "β" from horizontal "H1" toward the opening 80. Arc surface 176 is adapted to retain the blade 12 in the deburring tool upon a force being applied to the blade 12 in a substantially upward direction, such as a centrifugal or centripetal force or an operator of the deburring tool 10 removing the blade 12. Even more specifically, when the flex portion 46 of the blade 12 flexes downwardly during a deburring operation, the retaining portion 48 applies a force substantially downwardly upon the retention pin 22 to prevent the retaining portion 48 from rolling off the top of the retention pin 22. In fact, once the blade 12 is mounted in the arbor 14, only the flex portion 46 moves. The retaining and clip portions 48, 50, respectively, do not move.

Arc surface 178 is also defined on the inner perimeter of the slot 76 adjacent arc surface 176 and subtends the angle "γ" from horizontal "H1" away from arc surface 176. The sum of the angles "β" and "γ" is substantially 180°. In a preferred embodiment of the deburring tool 10, "β" is substantially 17.5°, and "γ" is substantially 162.5°.

As shown in FIG. 4B, an imaginary line "H2" extends substantially horizontally from the end of arc surface 176 proximate the opening 80, defining point "P1," entirely across the slot 76 to opposed surface 179 of the retaining portion 48 defined by the slot 76. Arc surface 180 extends from the end horizontal "H2" to arc surface 178. The point where arc surface 178 and arc surface 180 meet defines a point "P2." Arc surface 180 also defines a radius substantially equal to the diameter of the retention pin 22, and point "P1" is the substantial center of this radius. Arc surface 180 subtends a predetermined angle "δ" above horizontal "H2." Horizontal "H2" also is below and substantially parallel with horizontal "H1." Surface 179 is substantially vertical and extends from horizontal "H2" in a direction toward the bottom surface 54 of the blade 12. Arc surface 180 is adapted to act as a non-bearing surface such that a space is defined between arc surface 180 and the retention pin 22 to allow translational displacement of the blade 12 relative to the retention pin 22 for mounting or removal of the blade 12.

More specifically, arc surface 180 is defined on the inner perimeter of the slot 76 and subtends the angle "δ" from horizontal "H2" away from the opening 80. Even more specifically, in any position of the blade 12, the retention pin 22 does not make contact with arc surface 180. Thus, when the blade 12 is forced upwardly, which also forces the blade 12 rearwardly toward the clip portion 50 of the blade 12, arc surface 180 provides clearance and arc surfaces 176, 178 are displaced away from contact with the retention pin 22. This displacement permits the retaining portion 48 to be released from the retention pin 22, thus allowing for removal of the blade 12 from the holder 16. In a preferred embodiment of the deburring tool 10, "δ" is substantially 17.5°.

As shown in FIG. 4B, the slot 76 also defines a substantially vertical centerline "C" through midpoint "M" that substantially perpendicularly intersects horizontals "H1" and "H2" and arc surface 178. The centerline "C" is also substantially parallel to surface 179. Surface 181 extends from point "P1" in a direction toward the bottom surface 54 of the blade 12 and away from surface 179 such that surfaces 179 and 181 are non-parallel with respect to each other.

For ease of reference in describing the operation of the deburring tool 10, when moving in a counterclockwise fashion from the right side of FIG. 4B, the arc defined by the distance between horizontal "H2" and point "P2" is referred to as "A1." The arc defined by the distance between point "P2" and the centerline "C" is referred to as "A2." The arc defined by the distance between the centerline "C" and horizontal "H1" is referred to as "A3." And, the arc defined by the distance between the centerline "C" and point "P1" is referred to as "A4."

Figure 15:
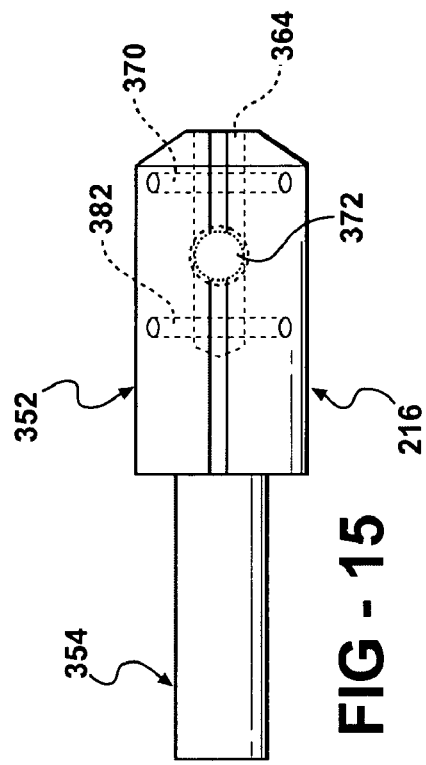
FIG. 15 is a top view of the holder of the deburring tool of the present invention shown in FIG. 13 illustrating the arbor hole, the mounting-pin holes, and the clamp-screw hole of the holder.
Figure 14:
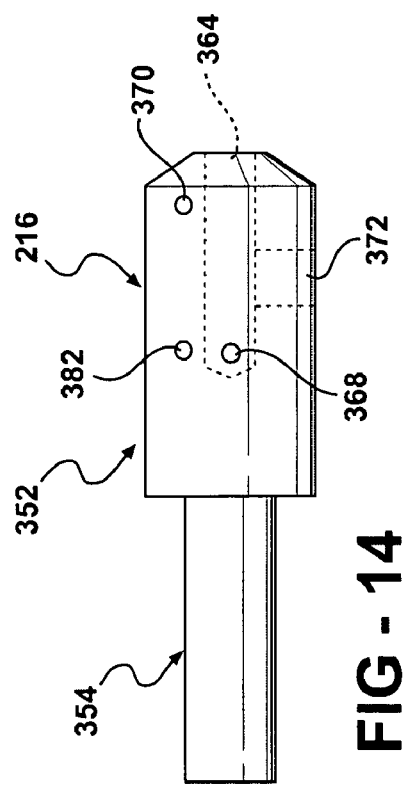
FIG. 14 is a side view of the holder of the deburring tool of the present invention shown in FIG. 13 illustrating the arbor hole, the mounting-pin holes, the stop-pin hole, and the clamp-screw hole of the holder.

Referring now to FIGS. 13 through 15, where like numerals are used to represent like structure of the deburring tool 10 increased by 200, a first embodiment of a fixed-position deburring tool, generally indicated at 210, is shown. The deburring tool 210, like the deburring tool 10, includes an elongated, substantially cylindrical, replaceable arbor, generally indicated at 214. The arbor 214 is adapted to support a replaceable, unitary blade, generally indicated at 212, within a recess 236 of the arbor 214. Unlike the deburring tool 10, however, the deburring tool 210 does not include an adjusting screw and, thereby, an adjusting-screw hole.

As shown in FIGS. 13 through 15, the deburring tool 210 also includes a holder, generally indicated at 216, adapted to receive and mount both the arbor 214 and the blade 212. The holder 216 includes an arbor hole 364, as shown in FIGS. 14 and 15. As shown in FIG. 13, the arbor 214 includes a chip slot 238.

As shown in FIGS. 13 through 15, the holder 216 is also adapted to support two mounting pins, i.e., a retention pin 222 and a clip pin 224, as well as a stop pin 226 and a clamp screw (not shown) within the holder 216. Accordingly, the holder 216 includes a retention-pin hole 370, a clip-pin hole 382, a stop-pin hole 368, and a clamp-screw hole 372.

Just as with the deburring tool 10, as the upper jaw 284 is activated by a hand of an operator of the deburring tool 210, for instance, the blade 212 is forced forwardly, or in a direction toward the head portion 244, resulting in the retention pin 222 retaining the retaining portion 248. Conversely, when the blade 212 is forced rearwardly, or in a direction toward the clip portion 250, the retaining portion 248 is released from the retention pin 222, thus allowing for removal of the blade 212 from the arbor 214.

It will be understood by those having ordinary skill in the art that the retaining portion 248 and the clip portion 250 can have any suitable size and shape and any suitable structural relationship with respect to one another to allow the blade 212 to flex during the deburring process. In other words, the retaining portion 248 and the clip portion 250 must be designed such that when the blade 212 is forced forwardly by a hand of an operator of the deburring tool 210, the retention pin 222 can retain the retaining portion 248. And, when the blade 212 is forced rearwardly, the retaining portion 248 can be released from the retention pin 222, thus allowing for removal of the blade 212 from the arbor 214.

As shown in FIGS. 16 through 18, where like numerals are used to represent like structure of the deburring tool 10 increased by 400, respectively, another, one-piece embodiment of a fixed-position deburring tool, generally indicated at 410, is shown. Like the deburring tools 10, 210, the deburring tool 410 includes an elongated, substantially cylindrical, replaceable arbor, generally indicated at 414. The arbor 414 is adapted to support a replaceable, unitary blade, generally indicated at 412. However, unlike the blades 12, 212, the blade 412 is substantially straight such that a retaining portion, generally indicated at 448, of the blade 412 does not form a stairway from a flex portion, generally indicated at 446, to a clip portion, generally indicated at 450, of the blade 412.

Like the arbors 12, 212, the arbor 414 includes, a slot 436 to support the blade 412 within the arbor 414. And, like the arbors 14, 214, the arbor 414 includes a chip slot 438 adapted to receive a head portion 444 of the blade 412.

Unlike the arbors 14, 214, the arbor 414 is adapted to receive a retention pin 422 and a clip pin 424 and, thus, further includes a retention-pin hole 570 and a clip-pin hole 582. And, the deburring tool 410, unlike the deburring tools 10, 210, does not include a holder. As such, unlike the arbors 14, 214, the arbor 414 is not fastened in a holder. Rather, the arbor 414 is fastened in a chuck of a drive motor, for instance, and, thus, cannot be exchanged absent removal of the arbor 414 from the chuck. In this way, the arbor 414 is essentially a disposable tool.

An elongated, substantially cylindrical shank 554 co-extends from and is integral with the end of the arbor 414 opposite the chip slot 438. As shown in FIGS. 16 and 17, the shank 554 is shorter than the arbor 414. The shank 554 is adapted to be received by the chuck of the drive motor.

Just as with the deburring tools 10, 210 as the upper jaw 484 is activated by a hand of an operator of the deburring tool 410, for instance, the blade 412 is forced forwardly, or in a direction toward the head portion 444, resulting in the retention pin 422 retaining the retaining portion 448. Conversely, when the blade 412 is forced rearwardly, or in a direction toward the clip portion 450, the retaining portion 448 is released from the retention pin 422, thus allowing for removal of the blade 412 from the arbor 414.

It will be understood by those having ordinary skill in the art that the retaining portion 448 and the clip portion 450 can have any suitable size and shape and any suitable structural relationship with respect to one another to allow the blade 412 to flex during the deburring process. In other words, the retaining portion 448 and the clip portion 450 must be designed such that when the blade 412 is forced forwardly by a hand of an operator of the deburring tool 410, the retention pin 422 can retain the retaining portion 448. And, when the blade 412 is forced rearwardly, the retaining portion 448 can be released from the retention pin 422, thus allowing for removal of the blade 412 from the arbor 414.

The blade 212, 412 is not adapted to pivot about the retention pin 222, 422 to adjust the unstressed position of the head portion 244, 444 of the blade 212, 412 with respect to the arbor 214, 414. Thus, the deburring tools 210, 410 are of the fixed-position type.

In operation of the deburring tool 10, 210, 410, the head portion 44, 244, 444 of the blade 12, 212, 412 is supported in an operable position in which the head portion 44, 244, 444 projects from the slot 38, 238, 438 in an unstressed position of the blade 12, 212, 412, as shown in FIGS. 1, 13, and 17. However, the blade 12, 212, 412 is resiliently yieldable so that the head portion 44, 244, 444 can move inwardly with respect to the slot 38, 238, 438.

At the beginning of a deburring operation, the shank 154, 354, 554 is mounted in a rotating chuck or a tool holder and rotated, and the arbor 14, 214, 414 is advanced into a hole of a work-piece. The hole has a leading edge and a trailing edge. The cutting leading surface 58, 258, 458 of the head portion 44, 244, 444 of the blade 12, 212, 412 engages the leading edge of the hole to remove burrs from the edge and form a slight chamfer on the edge.

The arbor 14, 214, 414 first engages the leading edge of the hole and advances into the hole. The leading edge applies a force upon the leading surface 58, 258, 458 in a substantially rearward and downward direction. However, as shown in FIG. 4B, since arc surface 178 along arc "A2" prevents the blade 12, 212, 412 from moving rearward, all resulting movement of the blade 12, 212, 412 is downward due to flexing of the flex portion 46, 246, 446 of the blade 12, 212, 412.

The non-cutting top surface 56, 256, 456 resiliently engages the wall of the hole as the blade 12, 212, 412 moves through the hole. As the arbor 14, 214, 414 exits the hole, the trailing edge of the hole applies a force upon the trailing cutting surface 60, 260, 460 in a substantially forward and downward direction. However, as shown in FIG. 4B, since arc surface 178 along arc "A3" prevents the blade 12, 212, 412 from moving forward, all resulting movement of the blade 12, 212, 412 is downward due to flexing of the flex portion 46, 246, 446 of the blade 12, 212, 412. When the head portion 44, 244, 444 clears the trailing edge of the hole, the direction of movement of the deburring tool 10, 210, 410 is reversed, and the cutting trailing surface 60, 260, 460 removes burrs from and slightly chamfers the trailing edge of the hole of the work-piece.

As the blade 12, 212, 412 is withdrawn into the hole, the engagement of the cutting trailing surface 60, 260, 460 with the trailing edge of the hole causes the blade 12, 212, 412 to yield and permit the head portion 44, 244, 444 to assume a stressed position. The amount of pressure applied by the cutting leading surface 58, 258, 258 and the cutting trailing surface 60, 260, 460 is determined by the resiliency of the blade 12, 212, 412 in the unstressed position of the head portion 44, 244, 444.

To insert a blade 12, 212, 412, the retention pin 22 is disposed into the slot 76 via the opening 80, as shown in FIG. 4. As the blade 12, 212, 412 is inserted, the retention pin 22 engages surface 181 while a force is exerted upon the blade 12, 212, 412 in a substantially downward direction. This engagement forces the blade 12, 212, 412 in a substantially rearward direction, which, in turn, forces the upper jaw 84, 284, 484 to open in relation to the lower jaw 82, 282, 482. Upon the blade 12, 212, 412 moving a sufficient distance in a substantially downward direction such that point "P1," as shown in FIG. 4B, is disposed below midpoint "M," the clip portion 50, 250, 450 springs the blade 12, 212, 412 in a substantially forward direction such that the retention pin 22, 222, 422 engages arc surfaces 176 and 178 along arc "A4."

To release the blade 12, 212, 412 the retention pin is displaced from the slot 76 via the opening 80 as shown in FIG. 4. As the blade 12, 212, 412 is retracted, the retention pin 22 engages surface 176 while force is exerted upon the blade 12, 212, 412 in a substantially upward direction. This engagement forces the blade 12, 212, 412 in a substantially rearward direction, which in turn, forces the upper jaw 84, 284, 484 to open in relation to the lower jaw 82, 282, 482. Upon the blade 12, 212, 412 moving a sufficient distance in a substantially upward direction such that point "P1", as shown in FIG. 4B, is disposed above midpoint "M" of the retention pin 22, 222, 422, the clip portion 50, 250, 450 springs the blade 12, 212, 412 in a substantially forward direction such that retention pin 22, 222, 422 is freed to be removed through opening 80, 280, 480. This is quickly and manually performed without use of any tools. In addition, this operation can be performed while the tool 10, 210, 410 remains mounted in a machine.

The deburring tool 10, 210, 410 includes the blade 12, 112, 412, and the deburring tool 10, 210 can include the pivot cradle 18, 218, respectively. Each of the blade 12, 212, 412 and the arbor 14, 214 can be replaced. Since the arbor 14, 214 is fastened in the holder 16, 216 with a clamp screw, a tool is required to replace the arbor 14, 214. On the other hand, since the arbor 414 is not fastened in a holder, the arbor 414 is essentially a disposable tool.

The deburring tool 10, 210, 410 is easier, faster, and more convenient and cost-effective than the deburring tools of the related art. Each of the arbor 14, 214, 414 and the blade 12, 212, 412 has a simple, efficient design to allow for low-cost manufacturing of the arbor 14, 214, 414 and the blade 12, 212, 412 from durable and very hard M-2 high-speed tool steel. The holder 16, 216 is left in the machine while the blade 12, 212 or the arbor 14, 214 may be exchanged, thereby eliminating the need to reset positions/movements of the machine and reducing downtime in any deburring operation to increase the efficiency thereof. Each of the arbor 14, 214 and the blade 12, 212 is interchangeable between a holder 16 and a holder 216 of the same size. The mounting parts, such as the retention pin 22, 222, 422 and the clip pin 24, 224, 424, last much longer than the mounting parts of the deburring tools of the related art. Most of the mechanics of the deburring tool 10, 210 are contained within the holder 16, 216. Finally, no holes are required to be formed in the arbor 14, 214.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A deburring tool adapted to be rotatably mounted in a chuck of a drive motor to perform deburring operations, said deburring tool comprising:
   an arbor and a blade having a cutting head portion defined at one end thereof and a clip portion defined substantially at the other end of said blade opposite said head portion;
   said blade mounted relative to said arbor such that said blade projects a predetermined distance from said arbor in an unstressed condition, said blade being sufficiently resiliently yieldable such that it can move inwardly with respect to said arbor during deburring operations, said clip portion adapted to flex to provide a spring-like force acting along said blade toward said head portion of said blade to facilitate insertion and removal of said blade relative to said deburring tool without use of any tools.

2. A deburring tool as set forth in claim 1, wherein said clip portion includes a lower jaw and an upper jaw disposed in spaced relation to said lower jaw, said lower and upper jaws adapted to flex with respect to each other to provide said spring-like force that aids in retaining said blade in said mounted condition with respect to said arbor.

3. A deburring tool as set forth in claim 2, wherein said clip portion further includes a reaction member that is operatively engaged by said lower and upper jaws, said lower and upper jaws being adapted to flex against said reaction member to provide said spring-like force, and said reaction member being adapted to support said blade relative to said deburring tool upon flexing of said lower and upper jaws.

4. A deburring tool as set forth in claim 3, wherein said reaction member is a clip pin that extends transversely to the longitudinal axis of said blade.

5. A deburring tool as set forth in claim 1, wherein said duburring tool further includes a retention pin, said blade further including a slot defined between said head and clip portions and adapted to receive said retention pin, said retention pin and said slot in said blade cooperating to retain said blade relative to said retention pin and to allow said blade to flex about said retention pin in a stressed condition of said blade when said blade moves inwardly with respect to said arbor during deburring operations.

6. A deburring tool as set forth in claim 5, wherein said slot in said blade defines an arc surface with an imaginary line extending substantially horizontally through the substantial midpoint of said slot, said arc surface subtending a predetermined angle "$\beta$" below said imaginary line and a predetermined angle "$\gamma$" above said imaginary line, said arc surface adapted to act as a bearing surface for said retention pin to retain said blade relative to said retention pin in the stressed condition of said blade.

7. A deburring tool as set forth in claim 6, wherein the sum of the angles "$\beta$" and "$\gamma$" is substantially 180°.

8. A deburring tool as set forth in claim 7, wherein the angle "$\beta$" is substantially 17.5° and the angle "$\gamma$" is substantially 162.5°.

9. A deburring tool as set forth in claim 6, wherein said slot in said blade further defines an arc surface subtending a predetermined angle "$\delta$" above said imaginary line and adapted to act as a non-bearing surface such that a space is defined between said arc surface and said retention pin to allow translational displacement of said blade relative to said retention pin for removal and insertion of said blade.

10. A deburring tool as set forth in claim 9, wherein said angle "$\delta$" is substantially 17.5°.

11. A deburring tool as set forth in claim 1, wherein said deburring tool further includes a pivot cradle adapted to pivotally support said blade and to adjust said predetermined distance that said cutting head projects from said arbor in an unstressed condition.

12. A deburring tool as set forth in claim 11, wherein said deburring tool further includes a retention pin and wherein said pivot cradle includes a body portion having a slot adapted to support said blade, said body portion adapted to pivot about said retention pin so as to adjust said predetermined distance that said cutting head projects from said arbor in said unstressed condition.

13. A deburring tool as set forth in claim 12, wherein said deburring tool further includes a holder having a central opening adapted to receive and mount said arbor and a cradle pocket that is adapted to receive and mount said pivot cradle, said pivot cradle including a tail portion, said deburring tool further including an adjusting screw operatively supported for adjustable movement in said holder of said deburring tool so as to engage said tail portion of said pivot cradle and, thereby, adjustably pivot said pivot cradle about said retention pin.

14. A deburring tool adapted to be rotatably mounted in a chuck of a drive motor to perform deburring operations, said deburring tool comprising:
   an arbor having a channel and a blade adapted to be received in said channel of said arbor, said blade having a cutting head portion defined at one end thereof that projects a predetermined distance from said arbor in an unstressed condition, said blade being sufficiently resiliently yieldable such that said blade can move inwardly with respect to said channel of said arbor during deburring operations; and
   a pivot cradle adapted to pivotally support said blade and to adjust said predetermined distance that said head portion projects from said arbor in the unstressed condition.

15. A deburring tool as set forth in claim 14, wherein said deburring tool further includes a retention pin and wherein said pivot cradle includes a body having a slot adapted to support said blade, said body adapted to pivot about said retention pin so as to adjust said predetermined distance that said head portion projects from said arbor in the unstressed condition.

16. A deburring tool as set forth in claim 15, wherein said deburring tool further includes a holder having a central opening adapted to receive and mount said arbor and a cradle pocket that is adapted to receive and mount said pivot cradle, said pivot cradle including a tail portion, said deburring tool further including an adjusting screw operatively supported for adjustable movement in said holder of said deburring tool so as to engage said tail portion of said pivot cradle and, thereby, adjustably pivot said pivot cradle about said retention pin.

17. A deburring tool as set forth in claim 14, wherein said deburring tool further includes a retention pin, said blade including a slot adapted to receive said retention pin and to flex about said retention pin in a stressed condition of said blade when said blade moves inwardly with respect to said channel of said arbor during deburring operations, said slot in said blade and said retention pin cooperating to retain said blade relative to said retention pin during deburring operations.

18. A deburring tool as set forth in claim 17, wherein said slot in said blade defines an arc surface with an imaginary line extending substantially horizontally through the substantial midpoint of said slot, said arc surface subtending a predetermined angle "β" below said imaginary line and a predetermined angle "γ" above said imaginary line, said arc surface adapted to act as a bearing surface for said retention pin to retain said blade relative to said retention pin in the stressed and unstressed position of said blade.

19. A deburring tool as set forth in claim 18, wherein the sum of the angles "β" and "γ" is substantially 180°.

20. A deburring tool as set forth in claim 19, wherein the angle "β" is substantially 17.5° and the angle "γ" is substantially 162.5°.

21. A deburring tool as set forth in claim 18, wherein said slot in said blade further defines an arc surface subtending a predetermined angle "δ" above said imaginary line and adapted to act as a non-bearing surface such that a space is defined between said arc surface subtending said predetermined angle "δ" and said retention pin to allow translational displacement of said blade relative to said retention pin for removal of said blade.

22. A deburring tool as set forth in claim 21, wherein said angle "δ" is substantially 17.5°.

* * * * *